United States Patent [19]

Wenzel et al.

[11] Patent Number: 4,569,981

[45] Date of Patent: Feb. 11, 1986

[54] SOLID, WATER-DISPERSIBLE PLASTICS PRECURSORS CONTAINING ISOCYANATE GROUPS, A PROCESS FOR THE PRODUCTION OF AQUEOUS PLASTICS DISPERSIONS USING SUCH PLASTICS PRECURSORS

[75] Inventors: Wolfgang Wenzel, Bergisch-Gladbach; Dieter Dieterich, Leverkusen, both of Fed. Rep. of Germany

[73] Assignee: Bayer Aktiengesellschaft, Leverkusen, Fed. Rep. of Germany

[21] Appl. No.: 280,425

[22] Filed: Jul. 6, 1981

[30] Foreign Application Priority Data

Jul. 18, 1980 [DE]  Fed. Rep. of Germany ....... 3027198

[51] Int. Cl.$^4$ .............................................. C08G 18/70
[52] U.S. Cl. ..................... 528/67; 524/589; 524/591; 528/68; 528/71; 528/76; 528/79; 528/80; 528/83; 528/85
[58] Field of Search ................. 260/29.2 TN; 528/67, 528/68, 71, 76, 80, 83, 79, 85

[56] References Cited

U.S. PATENT DOCUMENTS

| | | | |
|---|---|---|---|
| 3,388,087 | 6/1968 | Dieterich et al. | 260/29.2 |
| 3,461,103 | 8/1969 | Keberle et al. | 260/75 |
| 3,479,310 | 11/1969 | Dieterich et al. | 260/29.2 |
| 3,480,592 | 11/1969 | Dieterich et al. | 260/77.5 |
| 3,686,108 | 8/1972 | Reiff et al. | 260/29.2 TN |
| 3,756,992 | 9/1973 | Dieterich | 260/77.5 Q |
| 3,870,684 | 3/1975 | Witt et al. | 260/75 NH |
| 3,905,929 | 9/1975 | Noll | 260/29.2 TN |
| 3,935,146 | 1/1976 | Noll et al. | 260/29.2 TN |
| 4,094,842 | 6/1978 | Wenzel et al. | 260/29.2 TN |
| 4,108,814 | 8/1978 | Reiff et al. | 260/29.2 TN |
| 4,123,423 | 10/1978 | Wenzel et al. | 528/71 |
| 4,190,566 | 2/1980 | Noll et al. | 260/29.2 TN |
| 4,237,264 | 12/1980 | Noll et al. | 260/29.2 TN |
| 4,238,378 | 12/1980 | Markusch et al. | 260/29.2 TN |
| 4,240,942 | 12/1980 | Wenzel et al. | 260/29.2 TN |
| 4,269,748 | 5/1981 | Nachtkamp et al. | 260/29.2 TN |
| 4,303,774 | 12/1981 | Nachtkamp et al. | 260/29.2 TN |

FOREIGN PATENT DOCUMENTS 1148244  4/1969  United Kingdom .

*Primary Examiner*—Theodore E. Pertilla
*Attorney, Agent, or Firm*—Gene Harsh; Joseph C. Gil; Thomas W. Roy

[57] ABSTRACT

The present invention relates to water-dispersible plastics precursors which are solid at temperatures below about 40° C. The plastics precursors are based on isocyanate-terminated prepolymers which have been hydrophilically modified with ionic groups and/or ethylene oxide units and which contain specified amounts of isocyanate groups and —NH— groups.

The present invention also relates to processes for preparing aqueous dispersions from the solid plastics precursors and to using the plastics precursors for cross-linking dispersed plastics containing isocyanate-reactive groups.

1 Claim, No Drawings

SOLID, WATER-DISPERSIBLE PLASTICS PRECURSORS CONTAINING ISOCYANATE GROUPS, A PROCESS FOR THE PRODUCTION OF AQUEOUS PLASTICS DISPERSIONS USING SUCH PLASTICS PRECURSORS

BACKGROUND OF THE INVENTION

1. Field of the Invention

This invention relates to new water-dispersible plastics precursors which are solid at temperatures below about 40° C., to a process for the production of stable, aqueous plastics dispersion, particularly aqueous polyurethane-polyurea dispersions, and to the use of the plastics precursors as cross-linking agents for plastics dispersed in water.

2. Description of the Prior Art

Processes for the production of stable, aqueous polyurethane-polyurea dispersions are known (cf. for example German Pat. Nos. 1,184,946 and 1,178,586; German Auslegeschrift No. 1,237,306; German Offenlegungsschrift Nos. 1,495,745; 1,595,602; 1,770,068; 2,019,324; 2,314,512; 2,446,440; 2,811,148; and also D. Dieterich et al., Angew. Chem. 82., 53 (1970)). The described dispersions are based on the principle of incorporating hydrophilic centers into a macromolecular chain of a polyurethane-(polyurea) molecule. In the known dispersions, these hydrophilic centers or so called "internal emulsifiers" are ionic groups or ether functions. The groups are either incorporated into the prepolymer or are used as modified amines for chain-extending the prepolymers which contain at least two terminal NCO-functions.

The hitherto known dispersions may be produced by various processes, as described, for example, by D. Dieterich and H. Reiff in Angew. Makromol. Chemie 26, 85 (1972). In general, either a solution of a polyurethane in an organic solvent is converted into an aqueous dispersion or a prepolymer stage is dispersed in liquid form in water in the presence or absence of solvents. For example, a liquid prepolymer ionomer containing NCO-groups may be introduced into water with vigorous stirring, resulting initially in the formation of an emulsion of the prepolymer which further reacts by chain-extension with water or with a diamine or higher polyamine to form the high molecular weight polyurethane urea.

One particularly simple method of dispersion is described in German Offenlegungsschrift No. 1,913,271 (U.S. Pat. No. 3,756,992). In this method, a solid or liquid polyurethane polyelectrolyte capable of the addition of formaldehyde to form methylol groups is dispersed by mixing with water and is converted into a polyurethane polyelectrolyte containing methylol groups by the addition of the formaldehyde or formaldehyde derivatives. The thus-obtained polyurethane polyelectrolyte is condensed to completion in the dispersion or even on a substrate to form the high molecular weight polyurethane.

For dispersion, water is added to the stirrable melt until the water forms the continuous phase, the stage of a water-in-oil (W/O) emulsion generally being passed through to begin with. It is also possible to prepare a (W/O) emulsion at elevated temperatures, the thus-prepared emulsion changing into an oil-in-water (O/W) emulsion on cooling. The dispersion is almost always prepared at elevated temperature, preferably at temperatures of from 50 to 120° C. This is necessary, on the one hand, because the prepolymer stage to be dispersed has excessive viscosity at room temperature, with the result that expensive apparatus, such as screw extruders, would be necessary for dispersion, and, on the other hand, because the dispersion process generally takes place more quickly, the higher the temperature applied. The dispersion of solvent-free melts of NCO-prepolymers is also most always carried out at elevated temperature, the residual isocyanate reacting off with water and/or added amine.

Conventional ionomer dispersions generally show inadequate frost stability, so that storage and transportation in winter months are expensive because heated storage spaces are required. Apart from this, the transport of aqueous dispersions over considerable distances is basically unsatisfactory because large quantities of water have to be transported at great expense.

U.S. Pat. Nos. 4,094,842 and 4,123,423 describe possible methods of preparing the aqueous dispersions by the spontaneous dispersion of NCO-free solids in water and by the addition of any cross-linking additives which may be necessary at the consumer's end. The polymers, particularly polyurethanes, produced by the processes described in these publications are predominantly cross-linked products. However, it would be comparably desirable to produce predominantly linear products which are more suitable for numerous applications by virtue of the higher quality level thereof. However, these products would also have to be transported in solid form and only converted into an aqueous solution or dispersion at the consumer's end in order to make full use of this economic advantage.

It has now surprisingly been found that certain NCO-group-containing plastics precursors described in more detail below spontaneously change into a stable dispersion on contact with water at temperatures below the softening range thereof, and, after dispersion, may be reacted with suitable chain-extending agents or cross-linking agents to form high molecular weight plastics. Accordingly, it is possible to introduce these plastics precursors into an aqueous medium either in particulate form or (coarse) powder form or to pour an aqueous medium over them and thus to quasi "dissolve" them to form dispersions, the reactive NCO-groups remaining substantially intact.

These properties of the plastics precursors according to the present invention as described below are surprising because isocyanate groups are generally highly reactive to water, particularly when the isocyanate is present in a sufficiently hydrophilic form to ensure dispersibility in water. Thus, it is known that, when liquid NCO-prepolymers are slowly mixed with water, chain-extension and then cross-linking rapidly occur, accompanied by gelling, which, of course, makes it impossible to produce useful plastics dispersions. Since the "dissolution" process by which the dispersion is formed takes place relatively slowly in the case of solid NCO-group-free prepolymers according to the publications mentioned above, it had also been expected that, if an attempt was made to "dissolve" the solid in water to form a dispersion, the free isocyanate groups in the plastics precursors according to the present invention would react off with the water so quickly that the formation of a plastics dispersion would be prevented by premature extension or cross-linking.

SUMMARY OF THE INVENTION

The present invention relates to water-dispersible plastics precursors containing isocyanate groups and urethane, urea and/or amide groups which are solid at temperatures below about 40° C., characterized by (a) an average molecular weight of less than about 20,000;

(b) a content of chemically incorporated hydrophilic groups or potential hydrophilic groups ensuring dispersibility in water in the form of (i) from about 4 to 180 milliequivalents per 100 g of plastics precursors of ionic groups and/or groups convertible into ionic groups by a neutralization reaction and/or (ii) from about 2 to 20%, by weight based on the weight of the plastics precursors, of ethylene oxide units (—$CH_2$—$CH_2$—O—) incorporated in polyether chains;

(c) an isocyanate content of from about 0.2 to 18%, by weight based on the weight of the plastics precursors and (d) a content of from about 1.3 to 13%, by weight based on the weight of the plastics precursors, of —NH— groups present in the form of urethane groups —NH—CO—O—, urea groups —NH—CO—NH— and/or amide groups —NH—CO—.

The present invention also relates to a process for the production of aqueous plastics dispersions using the plastics precursors according to the present invention which is characterized in that the plastics precursors in powder, coarse powder or particulate form are introduced into or covered with an aqueous medium at a temperature below their softening range, any groups convertible into ionic groups which may be present being at least partly converted into ionic groups by a neutralization reaction either before, during or after the contact with water, after which the dispersed plastics precursors are reacted with water or other chain-extending agents or cross-linking agents containing isocyanate-reactive groups so that a stable, storable aqueous plastics dispersion is obtained.

The present invention also relates to the use of the plastics precursors according to the present invention as water-dispersible cross-linking agents for aqueous dispersions of plastics containing isocyanate-reactive groups.

DETAILED DESCRIPTION OF THE INVENTION

The plastics precursors according to the present invention are produced by the methods known in polyurethane chemistry, i.e. by reacting organic polyisocyanates with compounds containing isocyanate-reactive groups and optionally using starting materials containing hydrophilic groups or groups convertible into hydrophilic groups, particularly when the above-mentioned starting materials do not contain any such groups.

Suitable polyisocyanates are any of the polyisocyanates commonly encountered in polyurethane chemistry, as described for example in U.S. Pat. No. 3,756,992, incorporated herein by reference, at column 6, line 45 to column 7, line 19, although it is preferred to use the diisocyanates preferably used in polyurethane chemistry, such as 2,4- and/or 2,6-diisocyanatotoluene, 4,4'-diisocyanatodiphenyl methane or a mixture thereof with 2,4-diisocyanatodiphenyl methane, 4,4-diisocyanatodicyclohexyl methane or a mixture thereof with 2,4'-diisocyanatodicyclohexyl methane, hexamethylene diisocyanate or 1- socyanato-3, 3, 5-trimethyl-5-isocyanatomethyl cyclohexane (isophorone diisocyanate or IPDI). The particularly preferred starting diisocyanates are difunctional, aliphatic or cycloaliphatic and have a molecular weight from about 168 to 300.

Compounds containing isocyanate-reactive groups which are suitable for use in the production of the plastics precursors according to the present invention are the conventional synthesis components used in polyurethane chemistry which contain carboxyl groups, primary and/or secondary amino groups and, in particular, alcoholic hydroxyl groups and which have a molecular weight of from about 32 to 2500, preferably from about 62 to 1000. Providing the functionality thereof is known, the molecular weight of the relatively high molecular weight synthesis components falling within the scope of this definition may be determined from the functional group content thereof. If the functionality thereof is not known (for example higher polyester polyols), the molecular weight of these synthesis components may be determined by osmometry. The compounds generally contain up to 8, preferably 2 or 3, in particular 2,isocyanate-reactive groups of the type mentioned above. Suitable synthesis components of the type in question are described, for example, in U.S. Pat. No. 3,756,992 column 5, line 17 to column 6, line 39 and in U.S. Pat. No. 4,123,423 incorporated herein by reference at column 6, line 23 to column 8, line 30. Particularly preferred starting materials containing isocyanate-reactive groups are the corresponding polyester or polyether polyols having a molecular weight of from about 250 to 1000 and also the corresponding low molecular weight aliphatic polyols optionally containing ether or ester groups and having a molecular weight of from about 62 to 250.

In addition to the synthesis components mentioned in the prior publications cited above which have a functionality of at least two in the context of the isocyanate addition reaction, it is also possible to use monofunctional reaction components in the production of the plastics precursors according to the present invention, thus enabling any chain-termination which may be desired to be obtained. Such mono-functional synthesis components, in particular, aliphatic monoalcohols have a molecular weight of from about 32 to 200, such as methanol, ethanol, n-octanol or n-dodecanol or polyethers started with such alcohols.

As mentioned, above preferred synthesis components containing isocyanate-reactive groups are aliphatic alcohols which naturally react with the polyisocyanates to form urethane groups. By contrast, the use of primary or secondary polyamines which react with the isocyanate groups to form ureas or of carboxylic acids which react with the polyisocyanates to form amide groups is less preferred.

Since the plastics precursors according to the present invention are required to contain hydrophilic groups, i.e. in particular ethylene oxide units (—$CH_2$—$CH_2$—O—) arranged in polyether chains or ionic or potential ionic groups, such as ammonium groups, tertiary amino groups, carboxylate groups or carboxyl groups and/or sulphonate or sulphonic acid groups, and, in addition to the above-mentioned hydrophilic groups contain isocyanate groups or isocyanate-reactive groups are used instead of or preferably in addition to the exemplified synthesis components in the production of the plastics precursors according to the present invention.

The ionic groups or groups convertible into ionic groups are introduced into the plastics precursors according to the present invention in known manner by using compounds containing ionic groups or groups convertible into ionic groups and isocyanate groups or preferably isocyanate-reactive groups, such as, in particular alcoholic hydroxyl groups. Such compounds are described, for example, in U.S. Pat. Nos. 3,756,992; 3,479,310 and 4,108,814 all of which are hereby incorporated by reference. If it is desired to introduce free carboxyl groups as potential anionic groups, it is advisable to use compounds which, in addition to free carboxyl groups, contain groups which are more reactive to isocyanate groups, particularly hydroxyl groups. A typical example of such a synthesis component is dimethylol propionic acid which selectively reacts with organic polyisocyanates at room temperature or moderately elevated temperature to form urethane groups only, the free carboxyl group being left intact.

The ethylene oxide units incorporated in polyether chains which are optionally present in the plastics precursors according to the present invention are preferably introduced by using alcohols containing lateral or terminal ethylene oxide units and/or by using diisocyanates containing such polyalkylene side chains in the production of the plastics precursors. Such synthesis components with polyalkylene oxide chains containing ethylene oxide units are described, for example, in German Offenlegungsschriften Nos. 2,314,512; 2,651,506 and 2,314,513 and in U.S. Pat. Nos. 3,920,598; 3,905,929; 4,237,264 and 4,238,378, all of these U.S. Patents being hereby incorporated by reference.

Another possibility of introducing ethylene oxide units is to use polyether polyols containing a corresponding number of such units.

In the production of the plastics precursors according to the present invention, the exemplified hydrophilic or potentially hydrophilic synthesis components are used in quantities sufficient to ensure the dispersibility of the plastics precursors in water. To this end, both ionic or potentially ionic and also non-ionic hydrophilic groups of the type exemplified or even both types of hydrophilic groups may be incorporated at the same time. The content of the above-mentioned hydrophilic groups in the plastics precursors according to the present invention lies within the ranges indicated above. Where ionic groups or groups convertible into ionic groups are exclusively used as the hydrophilic groups, such groups are preferably incorporated in amounts from about 30 to 130 milliequivalents per 100 g of plastics precursors. Where ethylene oxide units incorporated in polyether chains are exclusively used as the hydrophilic groups, the ethylene oxide units are preferably used in amounts of from about 8 to 16% by weight based on the weight of the plastics precursors. Where both types of hydrophilic groups are present, the plastics precursors preferably contain from about 10 to 40 milliequivalents per 100 g of plastics precursors of ionic groups or groups convertible into ionic groups and, at the same time, from about 3 to 8%, by weight based on the weight of the plastics precursors of polyethylene oxide units incorporated in polyether chains.

If the dispersibility of the plastics precursors is guaranteed partially or completely by the incorporation of potential ionic groups, provision must of course, be made either before or during dispersion of the plastics precursors to ensure an at least partial conversion of the potential ionic groups into ionic groups, so that the content of ionic groups in the dispersed plastics precursors satisfies the conditions mentioned. Strictly speaking, plastics precursors whose dispersibility is guaranteed partly or completely by the presence of potential ionic groups are of course not dispersible in water, but only in water containing a corresponding neutralizing agent. The introduction of quaternary nitrogen into the plastics precursors is preferably obtained either by the incorporation of tertiary nitrogen atoms and the subsequent quaternization thereof or by the incorporation of tertiary nitrogen atoms and the neutralization thereof before or during dispersion.

The plastics precursors according to the present invention are produced by known methods of the type described, for example, in U.S. Pat. Nos. 3,756,992; 4,094,842, hereby incorporated by reference or 4,123,423 but with the very significant difference that excess quantities of organic polyisocyanates based on all the isocyanate-reactive groups, are always used in the production of the plastics precursors according to the present invention. In the production of the plastics precursors according to the present invention, the equivalent ratio between isocyanate groups and isocyanate-reactive groups is generally from about 1.05 1 to 3:1, preferably from about 1.2:1 to 2:1, so that the plastics precursors according to the present invention are guaranteed an NCO-content of from about 0.2 to 18%, by weight, preferably from about 2 to 11%, by weight based on the weight of the plastics precursors. In this connection, however, it is important to bear in mind that an equivalent ratio of greater than about 2.1:1 may only be considered where polyisocyanates having a functionality of more than two are used.

Furthermore, another important requirement in the production of the plastics precursors according to the present invention is that they should be solid at room temperature, i.e. at temperatures below about 40° C., preferably below about 50° C. This is achieved by selecting the nature and quantitative ratios of the synthesis components, particularly the average molecular weight and the functionality of the polyisocyanate component, as well as the average molecular weight and the average functionality of the isocyanate-reactive component in such a way that the plastics precursors according to the present invention contain from about 1.3 to 13%, by weight, preferably from about 2 to 10%, by weight based on the weight of the plastics precursors, of —NH-units in the form of urea groups (—NH—CO—NH—), amide groups (—NH—CO—) and/or in particular urethane groups (—NH—CO—O—).

In addition, the plastics precursors according to the present invention must have an average molecular weight below about 20,000 preferably from about 600 to 10,000, more particularly from about 1000 to 6000. This is also readily achieved by suitably selecting the molecular weight and functionality of the starting materials and also by suitably selecting the equivalent ratio between isocyanate groups and isocyanate-reactive groups. The molecular weight of the plastics precursors according to the present invention may be calculated from the stoichiometry of the reaction. If, for example, two moles of a dihydroxy compound having a molecular weight of 2000, 1 mole of a basic chain-extender having a molecular weight of 119 and 3.75 moles of diisocyanate (molecular weight 168) are reacted to form an oligourethane containing 2 terminal NCO-groups, the molecular weight is calculated to be $$MW = \frac{2}{1.5}(2 \times 2000 + 119 + 3.75 \times 168) = 6300$$

the factor 1.5 being obtained as follows: (moles of diisocyanate-moles of difunctional, NCO-reactive component ×2.

The plastics precursors according to the present invention are generally produced at temperatures of from about 10 to 150° C., preferably from about 40 to 120° C.

The thus-obtained plastics precursors according to the present invention may be dispersed in water very easily at temperatures below the softening point thereof. An aqueous solution having a pH below about 6 is used for dispersing a basic plastics precursor, i.e. a plastics precursor containing tertiary amino groups, in order to convert the tertiary amino groups into ammonium groups, and an aqueous solution having a pH above about 8 being used for dispersing a plastics precursors containing acid groups. Suitable aqueous solutions having pH values respectively below about 6 and above about 8 are, in particular aqueous solutions of inorganic or organic acids which do not react with the isocyanate groups under the dispersion conditions, such as hydrochloric acid, sulphuric acid, formic acid or oxalic acid, or solutions of bases which do not react with isocyanate groups under the dispersion conditions, such as sodium hydroxide, potassium hydroxide, trimethylamine or triethylamine.

In the dispersion of the plastics precursors according to the present invention, any potential ionic groups present only have to be converted into ionic groups when no other groups guaranteeing the dispersibility of the prepolymers are present. In any event, it is not advisable to combine a maximal quantity of ethylene oxide groups because in that case the hydrophilicity of the plastics precursors would be too high for most applications.

In the process according to the present invention for the production of aqueous plastics dispersions, the plastics precursors according to the present invention in powder, coarse-powder or particulate form are stirred into or covered with the aqueous medium at a temperature below their melting point. The plastics precursors according to the present invention may then be size-reduced, for example, mechanically in a mill. To this end, it is possible to use auxiliaries which promote brittleness, such as dry ice, or which prevent the solid particles from sticking together, such as silicone additives, fatty alcohols, fatty acid derivatives, waxes or "Aerosils", providing they do not react with isocyanate groups. However, it is not necessary for carrying out the process according to the present invention to pulverize the plastics precursors because, as mentioned above, they disperse spontaneously in water, even in the form of large pieces. To obtain satisfactory dispersions of the plastics precursors according to the present invention, it is very important that no chain-extending or cross-linking, isocyanate addition reaction take place to any significant extent before the dispersion is formed. The stability of the terminal isocyanate groups to water which this requires is dependent upon several factors. In principle, the reactivity of the isocyanate group is proportional to the hydrophilicity of the NCO-prepolymer, in other words given two NCO-prepolymers which are identical except for the hydrophilicity thereof, the NCO-groups of the more hydrophilic system will react more quickly with water. As may be seen from the examples, however, considerable pot lives (the time required to obtain complete reaction of the isocyanate groups present with water) are obtained even with NCO-prepolymers containing more than about 8% of $SO_3$-groups, based on the weight of the plastics precursors.

The choice of the terminal isocyanate group also has a bearing on the pot life. In principle, it is possible to use both aromatically bound and also aliphatically or cycloaliphatically bound isocyanate groups, although it is preferred to use aliphatically and cycloaliphatically bound isocyanate groups, the latter being particularly preferred.

It is, of course, also possible to use isocyanate mixtures, even of aliphatic and aromatic isocyanates, in the production of the plastics precursors, i.e. the NCO-terminated prepolymers. It is readily possible to synthesize the oligourethane by initially reacting an aromatic diisocyanate to form an OH-terminated prepolymer which is subsequently reacted with an aliphatic diisocyanate to form an NCO-terminated prepolymer.

The process according to the present invention for the production of aqueous plastics dispersions is very easy to carry out. For example, the water required for dispersion is initially introduced and the prepolymer is added to it, with gentle stirring, in particulate form, for example in the form of a granulate or even in the form of large pieces or a coarse powder. It is also possible initially to introduce the prepolymer in particulate or coarse-powder form, to pour the necessary quantity of water over it and then stir the whole to obtain fairly rapid dispersion. The ratio, by weight, of prepolymer to water is generally from about 65:35 to 5:95, preferably about 55:45 to 20:80. Stirring is not absolutely essential. Basically, the dispersion process does not require any shearing forces, although in that case the time required for dispersion is longer. In the absence of a stirrer, it is advisable to move the mixture back and forth or to stir it briefly by hand.

The temperature prevailing during the dispersion process should be below the softening point of the solid prepolymer so that the prepolymer does not agglomerate into large lumps. However, it is entirely possible to increase the temperature towards the end of the dispersion process (provided that at least a portion of the hydrophilicity of the prepolymer results from the presence of ionic groups) in order in this way to accelerate the dissolution process.

It is essential to the process according to the present invention that the water is always the continuous phase during the dispersion process. Only in this way is it possible to "dissolve" the solid at a temperature below its softening point to form a dispersion. The softening point may be determined relatively accurately by a thermomechanical dilatometer (TMD), the graphic representation of the results showing a distinct kink in the substantially linear stress-strain curve at the softening point. Softening ranges may also be determined by this method. Differential thermoanalysis (DTA) is more suitable for studying the softening ranges (R. Bonart, L. Morbitzer and H. Rinke, Kolloid-Z.u.Z. Polymere 240, 807 (1970); H. U. Herwieg, ibid 211, 34 (1966)).

In principle, the solid fragments may also be stirred during "dissolution", the water always representing the continuous phase.

The dispersion process in dependence upon the softening point of the prepolymer may be carried out at temperatures of from about 1 to 150° C., preferably from about 20 to 70° C. and, with particular preference, at about room temperature. It is generally carried out below the softening point of the solid.

The dispersion process may be assisted by emulsifiers, although this is not necessary. It may even be carried out in the presence of small quantities of solvents, such as acetone.

After dispersion of the plastics precursors according to the present invention, the isocyanate groups present naturally enter into a chain-extending reaction with the water. This chain-extending reaction may be accelerated by increasing the temperature of the dispersion of the plastics precursor. However, it is particularly preferred to carry out chain-extension after dispersion of the plastics precursors by means of a chain-extending agent which is soluble in water and which is more reactive than water to isocyanate groups. Chain-extending agents of this type are, in particular, water-soluble diamines containing two isocyanate-reactive groups, such as ethylene diamine, hexamethylene diamine or 1-amino-3,3,5-trimethyl-5-aminomethyl cyclohexane (IPDA). Hydrazine, for example in the form of hydrazine hydrate, may also be used as the chain-extending agent. It is also possible in principle to use water-soluble polyamines of higher functionality, for example diethylene triamine, in cases where it may be desired to branch the dispersed plastics. The chain-extending agents are preferably added after dispersion to ensure that the spontaneous addition reaction between the isocyanate groups and the isocyanate-reactive groups of the chain-extending agent do not impede or prevent dispersion. The chain-extending agents are preferably added in such quantities that the equivalent ratio between isocyanate groups and isocyanate-reactive groups of the chain-extending agent is from about 1:1 to 3:1, preferably from about 1.1:1 to 1.5:1. This chain-extending reaction of the dispersed plastics precursors is preferably carried out at room temperature.

In principle, it is, of course, also possible to introduce reactive centers, particularly olefinic compounds (for example in accordance with U.S. Pat. No. 4,123,423) into the plastics precursors according to the present invention by using suitable synthesis components, so that plastics dispersed in water and cross-linkable by UV-light are ultimately obtained.

The conventional cross-linking agents, such as melamine resins or formaldehyde, or other auxiliaries and additives, such as the conventional thickeners or fillers, may also be added to the plastics dispersions obtainable in accordance with the present invention.

The plastics dispersions obtained by the process according to the present invention, i.e. above all polyurethane-urea dispersions, may be used in a variety of different fields. For example, they may be used for dressing leather and for coating a variety of different materials, including textiles. In this case, they may be used, for example, as a surface coating. Other significant applications are as adhesives or lacquers. Further possible applications are, for example, as glass-fiber sizes, dispersion aids and in the impregnation of fibers and textiles. These products may also be regarded as additives for plastics dispersions or as binders, for example for cork or wood powder, glass fibers, asbestos, paper-like materials, plastics or rubber waste and ceramic materials.

The plastics precursors according to the present invention are also eminently suitable for use as waterdispersible cross-linking agents for aqueous polyurethane and polymer dispersions containing isocyanate-reactive centers. For this particular application, the plastics precursors according to the present invention are dispersed in the primary dispersions to be cross-linked by exactly the same procedure as described for dispersing the plastics precursors in water.

In the following Examples, all the percentages quoted are percentages, by weight. The average molecular weights of the described plastics precursors were determined by calculation from the stoichiometry of the starting materials. The granulates dispersed were produced by hammering the solidified melts and, accordingly, differ widely in the particle diameters thereof.

EXAMPLE 1

Mixture:
245.7 g of a propoxylated adduct of 2-butene-1,4-diol and $NaHSO_3$ (molecular weight 430) in the form of a 70% solution in toluene 177.6 g of isophorone diisocyanate (IPDI)

Procedure:
The adduct is freed from toluene with stirring for 1 hour in vacuo at 110° C. and then cooled to 100° C. The IPDI is then added, followed by stirring at 100° C. until a constant NCO-value is obtained (approximately 8 hours, $NCO_{const.}$:9.4%).

The melt is poured out into a metal trough lined with "Teflon". A melt is present at 110° C. The product may be size-reduced by hammering or using a mill.

Average molecular weight: 874
Softening point: 88-90° C.
$SO_3^-$-content: 114.4 milliequivalents/100 g; —NH— content (urethane): 3.4%, by weight The granulated product may be dispersed in water at room temperature using a simple propeller stirrer. After the solid has been "dissolved", it takes about 4 hours for the NCO-value to fall to 0%.

If, after dispersion in water, the NCO-group-containing oligourethane is extended with IPDA using an equivalent $NCO:NH_2$ ratio of 1.2:1, a finely divided dispersion is again obtained. For a solids content of 17.1%, the thus-obtained dispersion has a Ford cup viscosity (4 mm orifice) equivalent to 11.1 seconds. Its pH is 7.

EXAMPLE 2

The procedure is the same as in Example 1, except that the IPDI is replaced by an equimolar quantity of hexamethylene diisocyanate (134.4 g). The NCO-content amounts to 8.4.

Average molecular weight: 766
Softening point: 80-82° C. $SO_3^-$-content: 130.6 milliequivalents/100 g; —NH— content (urethane): 3.9%, by weight.

The granulated product may be dispersed in water at room temperature using a simple propeller stirrer. After the solid has been "dissolved", it takes about 1 hour for the NCO-value to fall to 0%.

If, after dispersion in water, the NCO-group-containing oligourethane is extended with IPDA in the same way as described in Example 1, a finely divided dispersion is obtained which has a viscosity of 200 mPa.s for a solids content of 27.7%. The dispersion has a pH of 7.

EXAMPLE 3

Mixture:
285.0 g of a bisphenol-A-started polypropylene oxide ether (OH-number 197)

113.6 g of a propoxylated adduct of 2-butene -1,4-diol and NaHSO$_3^-$ (molecular weight 430) in the form of a 70% solution in toluene.

228.1 g of isophorone diisocyanate (IPDI)

Procedure:

The polyether and the adduct are dehydrated with stirring for 1 hour in vacuo at 110° C., freed from the toluene and then cooled to 90° C. IPDI is then added, followed by stirring until a constant NCO-value (4.49%) is obtained. The melt is then poured out and size-reduced after cooling to room temperature.

Average molecular weight: 1730

Softening point: 79–80° C.

SO$_3^-$-content: 31.2 milliequivalents/100 g; —NH— content (urethane): 3.5%, by weight.

The granulated product may be dispersed in water at room temperature over a period of 30 minutes using a simple propeller stirrer. After the solid has been "dissolved", it takes about 22 hours for the NCO-value to fall to 0%. The 22.5% dispersion obtained has a Ford cup viscosity (4 mm orifice) of 11.4 seconds. The dispersion is stable to centrifuging and has a pH of 7.

If, after dispersion in water, the NCO-group-containing oligourethane is extended with an aqueous IPDA-solution in the same way as described in Example 1, a 12.5% solids content dispersion having a Ford cup viscosity equivalent to 10.6 seconds (4 mm orifice) and a pH of 7.5 is obtained.

EXAMPLE 4

Mixture:

285.0 g of a bisphenol-A-started polypropylene oxide ether (OH-number 197)

125.9 g of a propoxylated adduct of 2-butene -1,4-diol and NaHSO$_3$ (molecular weight 430) in the form of a 70% solution in toluene 272.7 g of a perhydrogenated 4,4'- and 2,4'-diphenyl methane diisocyanate isomer mixture (95:5%, by weight).

Procedure: (cf. Example 3)

The solid obtained has an NCO-content of 4.0%, an average molecular weight of 1820 and a softening range of from 70° to 72° C. The SO$_3^-$-content of the solid amounts to 31.7 milliequivalents per 100 g. The content of —NH—groups (urethane) amounts to 3.27%, by weight.

The granulate may be dispersed in water at room temperature over a period of 30 minutes using a magnetic stirrer. After the solid has "dissolved", it takes about 23 hours for the NCO-value to fall to 0%. The 15% solids content dispersion obtained has a Ford cup viscosity (4 mm orifice) equivalent to 11.3 seconds and a pH of 7.

If, after dispersion in water, the NCO-group-containing oliguurethane is extended with an aqueous IPDA-solution in the same way as described in Example 1, a 12% solids content dispersion having a Ford cup viscosity (4 mm orifice)equivalent to 11.1 seconds and a pH of 7 is obtained.

EXAMPLE 5

Mixture:

510.0 g of phthalic acid/ethylene glycol polyester (OH-number 288)

227.4 g of phthalic acid/adipic acid/ethylene glycol polyester (OH number 64)

127.2 g of butanol-started polyethylene oxide/polypropylene oxide polyether (OH-number 26; 78.3%, by weight, of ethylene oxide)

159.0 g of a propoxylated adduct of 2-butene -1,4-diol and NaHSO$_3$ (molecular weight 430) in the form of a 70% solution in toluene 341.4 g of a perhydrogenated 4,4'- and 2,4'-diphenyl methane diisocyanate isomer mixture (95.5%, by weight)

218.9 g of hexamethylene diisocyanate

Procedure: (cf. Example 3)

The solid obtained has an NCO-content of 4.72%, an average molecular weight of 1840 and an SO$_3^-$-content of 17.5 milliequivalents/100 g of solids. Its ethylene oxide content (incorporated in the polyether chain) amounts to 6.4%. It has a softening range of from 45 to 50° C. and an -NH-group (urethane) content of 3.4%, by weight. The granulate may be dispersed in water over a period of 3 hours with stirring at room temperature. After the solid has "dissolved", it takes about 170 hours for the NCO-content to fall to 0%. The 20% solids content dispersion obtained has a Ford cup viscosity (4 mm orifice) equivalent to 13.1 seconds and a pH of 7.

If, after dispersion in water, the NCO-group-containing oligourethane is extended with diethylene triamine in an NCO/NH$_2$-equivalent ratio of 1.2:1 (approximately 60% solution in water), a 20% dispersion having a Ford cup viscosity equivalent to 12.9 seconds and a pH of 7 is obtained. The dispersion shows a Tyndall effect in transmitted light.

EXAMPLE 6

If 200 ml of a 30% aqueous formaldehyde solution are added to a dispersion of the type described in Example 6 of German Offenlegungsschrift No. 2,446,440 (U.S. Pat. No. 4,108,814) and films are drawn from the resulting dispersion and then dried for 20 minutes at 150° C., the following physical values are measured:

tensile strength:6.6 MPa elongation at break:440%

If 5%, by weight, (based on solids), of the solid of Example 1 are added to this dispersion, "dissolved" in the dispersion and films subsequently drawn under the condition described above, the following physical values are measured:

tensile strength:18.3 MPa elongation at break:560%

EXAMPLE 7

Mixture:

319.0 g of bisphenol-A-started polypropylene oxide ether (OH-number 197)

276.5 g of a propoxylated adduct of 2-butene -1,4-diol and NaHSO$_3$ (molecular weight 430) in the form of a 70% solution in toluene 32.0 g of polydimethyl siloxane containing 2terminal —CH$_2$-OH—groups and having a hydroxyl content of 3%, by weight, 20.1 g of trimethylol propane 318.7 g of hexamethylene diisocyanate Procedure: (cf. Example 3)

The solid obtained has an NCO-content of 5.49%, an average molecular weight of 1251 and a softening range of from 70° to 75° C. The solid has an SO$_3$-content of 50.9 milliequivalents /100 g and an -NH-group (urethane) content of 4.3%, by weight.

The granulate may be dispersed in water over a period of 60 minutes at room temperature using a magnetic stirrer. After the solid has dissolved, it takes about 8 hours for the NCO-value to fall to 0%. The 30% solids content dispersion obtained has a Ford cup viscosity (4 mm orifice) equivalent to 15.1 seconds and a pH of 5.5.

If, after dispersion in water, the NCO-group-containing oligourethane is extended with diethylene triamine (approximately 60% solution in water) in the same way as described in Example 5, a 20% dispersion having a Ford cup viscosity equivalent to 15.8 seconds and a pH of 7.5 is obtained.

EXAMPLE 8

Mixture:
351.5 g of phthalic acid/ethylene glycol polyester (OH-number 287)
258.0 g of a propoxylated adduct of 2-butene-1,4-diol and $NaHSO_3$ (molecular weight 430) in the form of a 70% solution in toluene
310 g of hexamethylene diisocyanate
Procedure: (cf. Example 3)

The solid obtained has an NCO-content of 4.78%, an average molecular weight of 1600 and a softening range of from 68° to 70° C. The solid has an $SO_3^-$-content of 49.8 milliequivalents /100 g and an —NH-group (urethane) content of 4.7%, by weight.

The granulate may be dispersed in water at room temperature over a period of 30 minutes using a magnetic stirrer. After the solid has "dissolved", it takes about 2.5 hours for the NCO-content to fall to 0%. The 30% solids content dispersion obtained has a viscosity of 200 mPa.s and a pH of 6.5. A 20% solids content dispersion has a viscosity of 30 mPa.s and a pH of 6.5.

If, after dispersion in water, the NCO-group-containing oligourethane is extended with diethylene triamine (40% in water) in the same way as described in Example 5, a 30% solids content dispersion having a viscosity of 200 mPa.s and a pH of 8.0 is obtained.

EXAMPLE 9

Mixture:
560.7 g of phthalic acid/ethylene glycol polyester (OH-number 287)
127.2 g of a butanol-started polyethylene oxide/polypropylene oxide polyether (OH-number 26; 78.3%, by weight, of ethylene oxide)
159.0 g of a propoxylated adduct of 2-butene-1,4-diol and $NaHSO_3$ (molecular weight 430) in the form of a 70% solution in toluene
719.2 g of a perhydrogenated methyl-substituted diphenylmethane diisocyanate isomer mixture consisting of 35 % by weight of 4-methyl-3,4'-diisocyanato-, 15 % by weight of 2-methyl-5,4'-diisocyanto-10% by weight of 4-methyl-3,2'-diisocyanato-diphenylmethane and 40% by weight of other methyl-substituted diisocyanato-diphenylmethane isomers.
Procedure: (cf. Example 3)

The solid obtained has an NCO-content of 4.8%, an average molecular weight of 1815 and a softening range of from 68° to 70° C. The —NH-group (urethane) content amounts to 3.4%. The solid has an $SO_3^-$-content of 17 milliequivalents/100 g and an ethylene oxide content (in the incorporated polyether chain) of 6.5%.

The granulate may be dispersed in water with stirring over a period of 3.5 hours. After the solid has "dissolved", it takes about 96 hours for the NCO-content to fall to 0%. The 20% solids content dispersion obtained has a Ford cup viscosity (4 mm orifice) equivalent to 11.1 seconds and a pH of 7.

If, after dispersion in water, the NCO-group-containing oligourethane is extended with triethylene tetramine (approximately 50% in water) in the same way as described in Example 5, a 20% solids content dispersion has a Ford cup viscosity (4 mm orifice) equivalent to 10.6 seconds and a pH of 9.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Water-dispersible plastics precursors in powder, coarse powder or particulate form which remain solid at temperatures below about 40° C. and which contain isocyanate groups and urethane, urea and/or amide groups, characterized by
(a) and average molecular weight of less than about 20,000;
(b) a content of chemically incorporated hydrophilic groups or potential hydrophilic groups guaranteeing dispersibility in water in the form of (i) from about 4 to 180 milliequivalents per 100 g of plastics precursor of ionic groups and/or convertible into ionic groups by a neutralization reaction; and/or (ii) from about 2 to 20%, by weight based on the weight of the plastics precursors of ethylene oxide units (—$CH_2$—$CH_2$—O—) incorporated in polyether chains;
(c) an isocyanate content of from about 0.2 to 18%, by weight based on the weight of the plastics precursors; and
(d) a content of from 1.3 to 13%, by weight, based on the weight of the plastis precursors of —NH—groups in the form of urethane groups (—N-H—CO—O—), urea groups (—NH—CO—NH—) and/or amide groups (—NH—CO—).

* * * * *